United States Patent [19]

Stunkel

[11] 4,041,842
[45] Aug. 16, 1977

[54] DUAL-SOLENOID SAFETY VALVE

[76] Inventor: Barry A. Stunkel, 1170 W. Fork Drive, Lake Forest, Ill. 60045

[21] Appl. No.: 599,188

[22] Filed: July 25, 1975

[51] Int. Cl.² .................. F15B 11/08; F15B 13/04
[52] U.S. Cl. .................................. 91/448; 91/424; 91/450; 91/459; 137/554; 137/556
[58] Field of Search .................. 91/448–450, 91/424, 444, 459; 137/554, 556, 596.17

[56] References Cited

U.S. PATENT DOCUMENTS

| | | | |
|---|---|---|---|
| 2,231,583 | 2/1941 | Konig | 91/448 |
| 2,459,902 | 1/1949 | Tucker | 91/424 |
| 2,831,466 | 4/1958 | Stueland | 91/448 |
| 3,170,484 | 2/1965 | Benz et al. | 91/424 |
| 3,270,625 | 9/1966 | Huntington | 91/448 |
| 3,411,411 | 11/1968 | Fleck | 91/448 |
| 3,564,842 | 2/1971 | Van Marle | 91/448 |
| 3,605,554 | 9/1971 | Philbrick | 91/424 |
| 3,698,617 | 10/1972 | Fukaya | 91/448 |
| 3,706,321 | 12/1972 | Vicari | 137/554 |
| 3,763,744 | 10/1973 | Fournell | 91/450 |
| 3,813,990 | 6/1974 | Coppola | 91/1 |
| 3,943,972 | 3/1976 | Bitonti et al. | 137/596.17 |

Primary Examiner—William R. Cline
Assistant Examiner—Abraham Hershkovitz
Attorney, Agent, or Firm—Edward C. Threedy

[57] ABSTRACT

A safety control valve for pneumatically operated cyclic machines, such as power presses and press brakes, including a pair of solenoid valves connected to a pneumatic pressure source and adapted to operate as a series flow when the system is on, and a parallel exhaust when the system is off, and with either of said solenoid valves blocking communication to the pneumatically operated cyclic machine when such valve is not operated.

6 Claims, 1 Drawing Figure

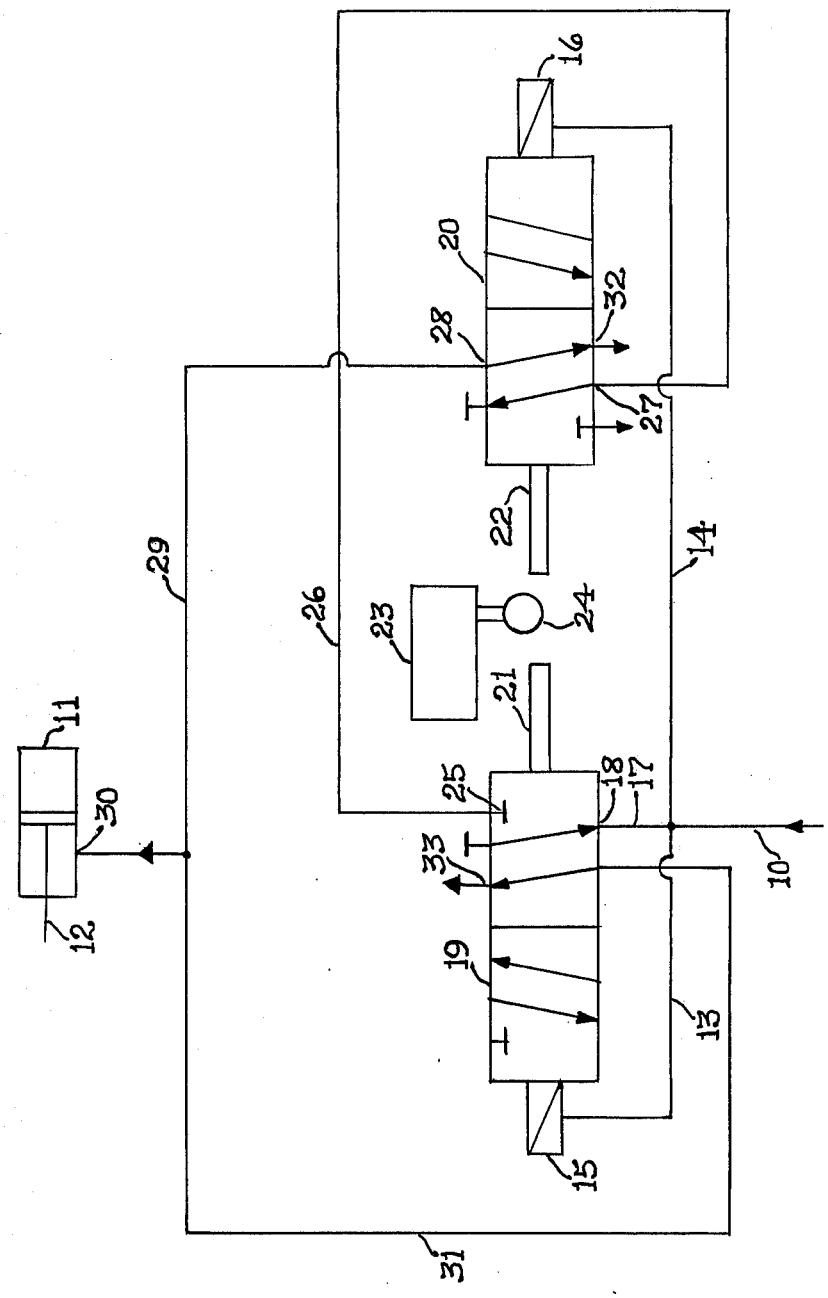

DUAL-SOLENOID SAFETY VALVE

SUMMARY OF THE INVENTION

Most mechanical press brakes and the like are operated by a clutch brake arrangement which automatically couples the crank shaft of the machine to the drive means and, at the conclusion of a work cycle, releases the clutch and couples the brake to the crank shaft. Very commonly the clutch is coupled by air pressure and released by biasing spring means when air pressure is cut off, the brake being arranged to engage and disengage in relation to the operation of the clutch.

The safety valve assembly operates to provide air supply pressure to the operating cyclinder of the associated machine and to exhaust such air pressure from the cylinder to the atmosphere. When the safety valve is operated properly, the air supply pressure has a series flow, in that it must flow through the first solenoid valve and then through the second solenoid valve before being introduced into the operating cylinder. When in an "off" position or inoperative condition, the safety valve exhausts the air pressure in the cylinder through both solenoid valves simultaneously.

GENERAL DESCRIPTION

The invention will be best understood by reference to the accompanying drawing showing the preferred form of the invention by which the objects thereof are accomplished, and in which:

The single FIGURE is a schematic line drawing of the dual-solenoid safety valve pneumatic circuit.

In the drawing there is illustrated by a line 10 a source of air pressure for operating the clutch brake arrangement of the associated machine through the operating air cylinder 11. The air cylinder 11 is shown schematically as having an operating piston 12 movable within the cylinder 11 in response to pneumatic pressure.

Line 10 is in communication with lines 13 and 14, which in turn feed directly into a pair of pilot solenoids 15 and 16, respectively. Line 10 also connects with line 17, which is in communication with the inlet port 18 of the control valve 19.

As shown, there is a second control valve 20 which, in a manner hereinafter described, is alternately connected in series with the control valve 19 and the cylinder 11, or in parallel with the control valve 19 under certain required situations.

The pilot solenoids 15 and 16 are each adapted to be electrically energized by a control circuit (not shown), which is a normal part of the operating circuit of the associated machine. Each of the control valves 19 and 20 includes a reciprocally operated spool pin 21 and 22, respectively, which in turn are arranged so as to operate a limit switch 23. As shown, the limit switch 23 has a movable plunger 24 disposed in the path of movement of either of the spool pins 21 and 22 in a manner hereinafter explained and for a purpose hereinafter described.

When the pilot solenoid 15 is electrically energized, the valve spool pin 21 associated with the control valve 19 will shift to the right to engage the plunger 24 of the limit switch 23, so as to operate the same. The movement of the armature of the pilot solenoid 15 is assisted by air pressure being introduced therein through the line 13, and in such movement the control valve 19 will be caused to have its inlet port 18 connected in open communication with the output port 25. This outlet port 25, through line 26, will supply air pressure to the inlet port 27 of the control valve 20.

When the pilot solenoid valve 16 is electrically energized, it will cause movement of its spool pin 22 to also engage the plunger 24 of the limit switch 23 to operate the same. Air pressure through the line 14 has been introduced into the pilot solenoid 16 to assist movement of its armature within the valve 20 so as to permit the air pressure thus introduced through the inlet port 27 into the valve 20 to be exhausted through exhaust port 28 where it, through line 29, will be introduced into the inlet port 30 of the cylinder 11 so as to effect movement of the piston 12 thereof.

When both pilot solenoid valves 15 and 16 are deenergized, the corresponding spool pins 21 and 22 as well as their armatures within the valves 19 and 20 will return to their original position, permitting the limit switch 23 to reopen and to allow the air pressure in the cylinder 11 to reverse its flow through the line 29 into the valve 20 and through the line 31 into the valve 19, where the same are respectively exhausted through the outlet ports 32 and 33 into the atmosphere.

In the event that either valve 19 or 20 is not operated, air pressure will not be applied to the cylinder 11, because the valve that did not operate will block the air from being admitted into line 29 of the system.

In the event that the system has operated properly to pneumatically effect movement of the piston 12 of the cylinder 11, and the pilot solenoid 16 of the valve 20 becomes deenergized while the pilot solenoid 15 of the valve 19 is still energized, the cylinder 11 will be exhausted through the line 29 or line 28 of valve 20 and out the outlet port 32 thereof. The incoming air pressure which is still being transmitted from line 10 through line 17, inlet port 18 of valve 19, through outlet port 25 of valve 19, through line 26, will be blocked at the inlet port 27 of the valve 20.

If the pilot solenoid 16 and control valve 20 remain energized and operative while the pilot solenoid 15 and valve 19 become inoperative, the cylinder 11 will be exhausted through line 31 and out the exhaust port 33 of valve 19. This in turn will disconnect the air supply to valve 20 as hereinbefore made apparent. If either of the two inoperative situations as above explained occur, the limit switch 23 will not open since either of the pins 21 or 22 of either of the operative valves 19 or 20 will not have been moved away from the movable plunger 24 of the switch 23, thus indicating that the valve has malfunctioned at that particular point of cyclic operation. Electronic controls monitoring the limit switch 23 will sense the malfunction and will keep the other valve from being reactivated and effectively prevent energization of the cylinder 11 to operate its piston 12.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A dual-solenoid operated safety valve system for controlling the source of operating pneumatic pressure to a machine including a piston having reciprocal motion, comprising a. a pair of control valves interposed between the source of operating pneumatic pressure and the piston of the machine, with each valve having an inoperative position wherein the pneumatic pressure is prevented from being admitted to and operating the piston of the machine, b. electrically operated solenoid means for each of said control valves for independently operating the same so as to change said valves from their normal inoperative position to an operative position when said solenoid means are energized, c. means connecting said control valves in series when moved into their operative position by said solenoid means so as to connect the source of operating pneumatic pressure through each of said control valves to the piston of the machine, d. means connecting said control valves in parallel with the piston of the machine so as to exhaust pneumatic pressure therefrom when either or both valves are in their inoperative position, and e. switch means interposed between said control valves and operable by means provided by each of said control valves for electrically sensing when either of said valves remains in its operative position after said solenoid means are deenergized and for preventing reactivation of either of said control valves.

2. A dual-solenoid operated safety valve system as defined by claim 1, wherein said switch means comprises a normally open switch adapted to be closed by means movable into and out of contact with said switch means by operation of said control valves.

3. A dual-solenoid operated safety valve system as defined by claim 2, wherein said means movable by said control valves comprises pins carried by and movable longitudinally of each of said control valves when either of said control valves is operated.

4. A dual-solenoid operated safety valve system as defined by claim 1, wherein said means connecting said control valves in series comprises a conduit from the source of operating pneumatic pressure to an inlet port in one of said control valves, a conduit between an outlet port provided by said one of said control valves connected to an inlet port provided by said other of said control valves, and a conduit between an outlet port provided by said other of said control valves and the piston of the machine when both of said valves are operated.

5. A dual-solenoid operated safety valve system as defined by claim 4, wherein said switch means comprises a normally open switch adapted to be closed by means movable into and out of contact with said switch means by operation of said control valves.

6. A dual-solenoid operated safety valve system as defined by claim 5, wherein said means movable by said control valves comprises pins carried by and movable longitudinally of each of said control valves with either of said control valves is operated.

* * * * *